US012133300B2

(12) United States Patent
Qiu

(10) Patent No.: US 12,133,300 B2
(45) Date of Patent: Oct. 29, 2024

(54) WIRELESS COLOR TUNING FOR CONSTANT-CURRENT DRIVER

(71) Applicant: Lumileds LLC, San Jose, CA (US)

(72) Inventor: Yifeng Qiu, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 18/219,508

(22) Filed: Jul. 7, 2023

(65) Prior Publication Data

US 2024/0008150 A1 Jan. 4, 2024

Related U.S. Application Data

(63) Continuation of application No. 17/872,638, filed on Jul. 25, 2022, now Pat. No. 11,743,980, which is a continuation of application No. 16/995,525, filed on Aug. 17, 2020, now Pat. No. 11,477,864, which is a continuation of application No. 16/513,493, filed on Jul. 16, 2019, now Pat. No. 10,772,169.

(Continued)

(51) Int. Cl.
*H05B 45/00* (2022.01)
*H05B 45/37* (2020.01)

(52) U.S. Cl.
CPC ............. *H05B 45/00* (2020.01); *H05B 45/37* (2020.01)

(58) Field of Classification Search
CPC ........ H05B 45/00; H05B 45/37; H05B 45/46; H05B 47/18; H05B 47/19
See application file for complete search history.

(56) References Cited

U.S. PATENT DOCUMENTS 7,276,863 B2 10/2007 Lee et al.
9,241,384 B2 * 1/2016 van de Ven ......... H01L 25/0753

(Continued)

FOREIGN PATENT DOCUMENTS

CN 101331796 A 12/2008
CN 103069591 A 4/2013

(Continued)

OTHER PUBLICATIONS

"U.S. Appl. No. 16/513,493, Non Final Office Action mailed Oct. 30, 2019", 9 pgs.

(Continued)

*Primary Examiner* — Minh D A
(74) *Attorney, Agent, or Firm* — Schwegman, Lundberg & Woessner, P.A.

(57) ABSTRACT

Various embodiments include apparatuses and methods enabling a wireless control apparatus for an LED array. In one example, a control apparatus includes a wireless module to receive a signal from a wireless control-device. The wireless signal may include signals related to a desired CCT value and a $D_{uv}$ value. A control unit is coupled to the wireless module to translate signals received from the wireless module. The control unit is also coupled to the LED array and to an LED driver. The control unit receive powers for the LED array from the LED driver and provides the power to the LED array in a manner based on the translated signals. A dimmer emulator is coupled to the control unit to provide one or more control signals to the LED driver. Other apparatuses and methods are described.

20 Claims, 7 Drawing Sheets

Related U.S. Application Data

(60) Provisional application No. 62/853,515, filed on May 28, 2019.

(56) References Cited

U.S. PATENT DOCUMENTS

| | | | | |
|---|---|---|---|---|
| 9,332,598 | B1 | 5/2016 | Ho et al. | |
| 10,104,741 | B2 | 10/2018 | Choi et al. | |
| 10,772,169 | B1 | 9/2020 | Qiu | |
| 11,743,980 | B2 | 8/2023 | Qiu | |
| 2011/0273107 | A1 | 11/2011 | Hsia et al. | |
| 2014/0035472 | A1 | 2/2014 | Raj et al. | |
| 2014/0106639 | A1 | 4/2014 | Harbers | |
| 2015/0108904 | A1 | 4/2015 | Chen | |
| 2015/0145418 | A1* | 5/2015 | Pope | H05B 47/11 315/149 |
| 2016/0316527 | A1* | 10/2016 | Allen | H05B 45/20 |
| 2017/0127485 | A1 | 5/2017 | Hsia | |
| 2018/0073689 | A1 | 3/2018 | Soer et al. | |
| 2018/0116039 | A1 | 4/2018 | Harte et al. | |
| 2018/0252374 | A1* | 9/2018 | Keller | F21S 19/005 |
| 2018/0259140 | A1* | 9/2018 | Keller | F21S 8/006 |
| 2019/0008013 | A1 | 1/2019 | Diana et al. | |
| 2019/0082515 | A1 | 3/2019 | Demayo et al. | |
| 2019/0110406 | A1 | 4/2019 | Adams et al. | |
| 2020/0383183 | A1 | 12/2020 | Qiu | |
| 2022/0369435 | A1 | 11/2022 | Qiu | |

FOREIGN PATENT DOCUMENTS

| | | | |
|---|---|---|---|
| CN | 105830354 | A | 8/2016 |
| CN | 108463026 | A | 8/2018 |
| TW | 200629967 | A | 8/2006 |
| TW | 202114473 | A | 4/2021 |
| WO | WO-2017189571 | A1 | 11/2017 |
| WO | WO-2020243202 | A1 | 12/2020 |

OTHER PUBLICATIONS

"U.S. Appl. No. 16/513,493, Notice of Allowance mailed May 7, 2020", 8 pgs.
"U.S. Appl. No. 16/513,493, Response filed Mar. 2, 2020 to Non Final Office Action mailed Oct. 30, 2019", 16 pgs.
"U.S. Appl. No. 16/995,525, Corrected Notice of Allowability mailed Sep. 14, 2022", 2 pgs.
"U.S. Appl. No. 16/995,525, Non Final Office Action mailed Feb. 24, 2022", 7 pgs.
"U.S. Appl. No. 16/995,525, Non Final Office Action mailed Sep. 2, 2021", 6 pgs.
"U.S. Appl. No. 16/995,525, Notice of Allowance mailed May 11, 2022", 8 pgs.
"U.S. Appl. No. 16/995,525, Response filed Apr. 28, 2022 to Non Final Office Action mailed Feb. 24, 2022", 12 pgs.
"U.S. Appl. No. 16/995,525, Response filed Nov. 4, 2021 to Non Final Office Action mailed Sep. 2, 2021", 8 pgs.
"U.S. Appl. No. 17/872,638, Non Final Office Action mailed Dec. 29, 2022", 14 pgs.
"U.S. Appl. No. 17/872,638, Notice of Allowance mailed Apr. 14, 2023", 8 pgs.
"U.S. Appl. No. 17/872,638, Response filed Mar. 29, 2023 to Non Final Office Action mailed Dec. 29, 2022", 9 pgs.
"Chinese Application Serial No. 202080055100.8, Office Action mailed Feb. 5, 2023", With English Translation, 23 pgs.
"Chinese Application Serial No. 202080055100.8, Office Action mailed Aug. 1, 2022", (w/ English Translation), 14 pgs.
"Chinese Application Serial No. 202080055100.8, Response Filed Dec. 15, 2022 to Office Action mailed Aug. 1, 2022", (w/ Translation of English Claims), 26 pgs.
"European Application Serial No. 19203165.6, extended European Search Report mailed Apr. 2, 2020", 8 pgs.
"International Application Serial No. PCT/US2020/034751, International Preliminary Report on Patentability mailed Dec. 9, 2021", 10 pgs.
"International Application Serial No. PCT/US2020/034751, International Search Report mailed Aug. 12, 2020", 4 pgs.
"International Application Serial No. PCT/US2020/034751, Written Opinion mailed Aug. 12, 2020", 8 pgs.
"Taiwanese Application Serial No. 109117944, First Office Action mailed May 28, 2021", (w/ English Abstract), 13 pgs.
"Taiwanese Application Serial No. 109117944, Response filed Aug. 23, 2021 to First Office Action mailed May 28, 2021", w/ English Claims, 38 pgs.
"Chinese Application Serial No. 202080055100.8, Decision of Rejection mailed May 18, 2023", with machine English translation, 17 pages.
"Chinese Application Serial No. 202080055100.8, Response filed Apr. 19, 2023 to Office Action mailed Feb. 5, 2023", with English claims, 25 pages.
U.S. Appl. No. 16/513,493 U.S. Pat. No. 10,772,169, filed Jul. 16, 2019, Wireless Color Tuning For Constant-Current Driver.
U.S. Appl. No. 16/995,525 U.S. Pat. No. 11,477,864, filed Aug. 17, 2020, Wireless Color Tuning For Constant-Current Driver.
U.S. Appl. No. 17/872,638, filed Jul. 25, 2022, Wireless Color Tuning For Constant-Current Driver.
"U.S. Appl. No. 17/872,638, Corrected Notice of Allowability mailed Aug. 4, 2023", 2 pages.
"European Application Serial No. 20732087.0, Communication Pursuant to Article 94(3) EPC mailed Nov. 3, 2023", 9 pages.
"European Application Serial No. 20732087.0, Response filed Feb. 29, 2024 to Communication Pursuant to Article 94(3) EPC mailed Nov. 3, 2023", 67 pgs.

* cited by examiner

WIRELESS COLOR TUNING FOR CONSTANT-CURRENT DRIVER

CLAIM OF PRIORITY

This patent application is a continuation of U.S. patent application Ser. No. 17/872,638, filed Jul. 25, 2022, which claims priority to U.S. patent application Ser. No. 16/995,525, entitled, "WIRELESS COLOR TUNING FOR CONSTANT-CURRENT DRIVER," filed 17 Aug. 2020; which claims priority to U.S. patent application Ser. No. 16/513,493, entitled, "WIRELESS COLOR TUNING FOR CONSTANT-CURRENT DRIVER," filed 16 Jul. 2019; which claims priority to U.S. Provisional Application Ser. No. 62/853,515, entitled, "WIRELESS COLOR TUNING SYSTEM FOR SINGLE-CHANNEL CONSTANT CURRENT DRIVER," filed 28 May 2019; the disclosures of which are incorporated herein by reference in their entireties.

TECHNICAL FIELD

The subject matter disclosed herein relates to color tuning of one or more light-emitting diodes (LEDs) or LED arrays that comprise a lamp operating substantially in the visible portion of the electromagnetic spectrum. More specifically, the disclosed subject matter relates to a technique to enable, for example, a wireless color-tuning device for a single-channel, constant-current driver for the LED arrays.

BACKGROUND

Light-emitting diodes (LEDs) are commonly used in various lighting operations. The color appearance of an object is determined, in part, by the spectral power density (SPD) of light illuminating the object. For humans viewing an object, the SPD is the relative intensity for various wavelengths within the visible light spectrum. However, other factors can also affect color appearance. Also, both a correlated color temperature (CCT) of the LED, and a distance of the temperature of the LED on the CCT from a black-body line (BBL, also known as a black-body locus or a Planckian locus), can affect a human's perception of an object. In particular there is a large market demand for LED lighting solutions, such as in retail and hospitality lighting applications, where it is desirable to control both a color temperature and a brightness level of the LEDs.

There are presently two major technologies for color tuning (e.g., white tuning) of LEDs. A first technology is based on white LEDs of two or more CCTs. The second technology is based on a combination of Red/Green/Blue/Amber colors. The first technology simply does not have a capability to tune LEDs in the $D_{uv}$ direction. In the second technology, the color tuning capability is seldom offered as an available function. In those cases, the user is instead usually offered a color wheel based on either Red-Green-Blue (RGB) or Hue-Saturation-Lightness (HSL) models. However, the RGB and HSL models were not designed for general illumination. Both the RGB and HSL model are more appropriate for graphics or photographic applications.

The information described in this section is provided to offer the skilled artisan a context for the following disclosed subject matter and should not be considered as admitted prior art.

DETAILED DESCRIPTION

Figure 1:
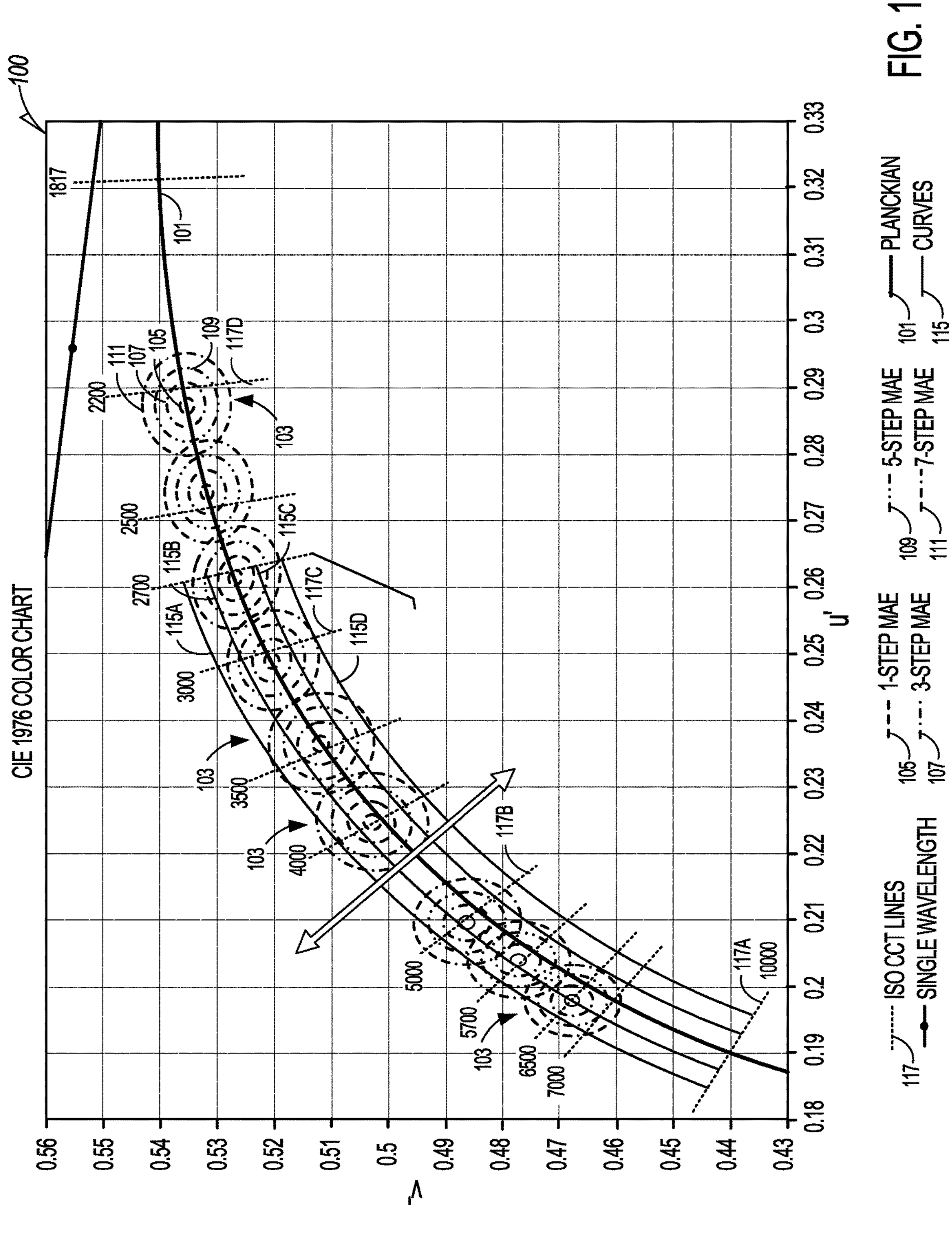
FIG. 1 shows a portion of an International Commission on Illumination (CIE) color chart, including a black body line (BBL)

The disclosed subject matter will now be described in detail with reference to a few general and specific embodiments as illustrated in various ones of the accompanying drawings. In the following description, numerous specific details are set forth in order to provide a thorough understanding of the disclosed subject matter. It will be apparent, however, to one skilled in the art, that the disclosed subject matter may be practiced without some or all of these specific details. In other instances, well-known process steps or structures have not been described in detail so as not to obscure the disclosed subject matter.

Examples of different light illumination systems and/or light-emitting diode implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer generally to like elements throughout.

Further, it will be understood that, although the terms first, second, third, etc. may be used herein to describe various elements. However, these elements should not be limited by these terms. These terms may be used to distinguish one element from another. For example, a first element may be termed a second element and a second element may be termed a first element without departing from the scope of the disclosed subject matter. As used herein, the term "and/or" may include any and all combinations of one or more of the associated listed items.

It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper," "lower," "horizontal," or "vertical" may be used herein to describe a relationship of one element, zone, or region relative to another element, zone, or region as illustrated in the figures. A person of ordinary skill in the art will understand that these terms are intended to encompass different orientations of the device in addition to an orientation depicted in the figures. Further, whether the LEDs, LED arrays, electrical components and/or electronic components are housed on one, two, or more electronics boards, or in one or multiple physical locations may also depend on design constraints and/or a specific application.

Semiconductor-based light-emitting devices or optical power-emitting-devices, such as devices that emit ultraviolet (UV) or infrared (IR) optical power, are among the most efficient light sources currently available. These devices may include light-emitting diodes, resonant-cavity light emitting diodes, vertical-cavity laser diodes, edge-emitting lasers, or the like (simply referred to herein as LEDs). Due to their compact size and low power requirements, LEDs may be attractive candidates for many different applications. For example, they may be used as light sources (e.g., flash lights and camera flashes) for hand-held battery-powered devices, such as cameras and cellular phones. LEDs may also be used, for example, for automotive lighting, heads-up display (HUD) lighting, horticultural lighting, street lighting, a torch for video, general illumination (e.g., home, shop, office and studio lighting, theater/stage lighting, and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where enhanced brightness is desired or required.

In various environments where LED-based lamps (or related illumination devices) are used to illuminate objects as well as for general lighting, it may be desirable to control aspects of the color temperature of the LED-based lamps (or a single lamp) in addition to a relative brightness (e.g., luminous flux) of the lamps. Such environments may include, for example, retail locations as well as hospitality locations such as restaurants and the like. In addition to the CCT, another lamp metric is the color-rendering index (CRI) of the lamp. The CRI is defined by the International Commission on Illumination (CIE) and provides a quantitative measure of an ability of any light source (including LEDs) to accurately represent colors in various objects in comparison with an ideal, or natural-light source. The highest possible CRI value is 100. Another quantitative lamp metric is $D_{uv}$. The $D_{uv}$ is a metric defined in, for example, CIE 1960, to represent the distance of a color point to the BBL. It is a positive value if the color point is above the BBL and a negative value if the color point is below the BBL. Color points above the BBL appear greenish in color and those below the BBL appear pinkish in color. The disclosed subject matter provides an apparatus to control both a color temperature (CCT and $D_{uv}$) as well as a brightness level of the lamp. As described herein, the color temperature is related to both CCT and $D_{uv}$ in color-tuning applications.

The disclosed subject matter is therefore directed to a wireless color-tuning (covering one or both of CCT and $D_{uv}$) scheme for driving various colors of LEDs including, for example, primary color (Red-Green-Blue or RGB) LEDs, or desaturated (pastel) RGB color LEDs, to make light of various color temperatures with a high color-rendering index (CRI) and high efficiency, specifically addressing color mixing using phosphor-converted color LEDs. Upon reading and understanding the disclosed subject matter, a person of ordinary skill in the art will recognize that a similar scheme can be used for wireless control of luminous flux (e.g., "brightness level") of the LEDs as well.

As is known in the relevant art, the forward voltage of direct color LEDs decreases with increasing dominant wavelength. These LEDS can be driven with, for example, multichannel DC-to-DC converters. Advanced phosphor-converted color LEDs, targeting high efficacy and CRI, have been created providing for new possibilities for correlated color temperature (CCT) tuning applications. Some of the advanced color LEDs have desaturated color points and can be mixed to achieve white colors with 90+ CRI over a wide CCT range. Other LEDs having 80+ CRI implementations, or even 70+ CRI implementations (or even lower CRI values), may also be used with the disclosed subject matter. These possibilities use LED circuits that realize, and increase or maximize, this potential. At the same time, the control circuits described herein are compatible with single-channel constant-current drivers to facilitate market adoption.

As is known to a person of ordinary skill in the art, since light output of an LED is proportional to an amount of current used to drive the LED, dimming an LED can be achieved by, for example, reducing the forward current transferred to the LED. In addition to or instead of changing an amount of current used to drive each of a number of individual LEDs, a control unit (described in detail with reference to FIG. 4, below) or other type of multiplexer, switching apparatus, or similar apparatus known in the art, may rapidly switch selected ones of the LEDs between "on" and "off" states to achieve an appropriate level of dimming and color temperature for the selected lamp.

Generally, LED drive circuits are formed using either an analog-driver approach or a pulse-width modulation (PWM)-driver approach. In an analog driver approach, all colors are driven simultaneously. Each LED is driven independently by providing a different current for each LED. The analog driver results in a color shift and currently there is not a way to shift current three ways. Analog driving often results in certain colors of LEDs being driven into low current mode and other times, into very high current mode. Such a wide dynamic range imposes a challenge on sensing and control hardware.

In a PWM driver, each color is switched on, in sequence, at high speed. Each color is driven with substantially the same current. The mixed color is controlled by changing the duty cycle of each color. That is, one color can be driven for twice as long as another color to add into the mixed color. As human vision is unable to perceive very fast changing colors, the light appears to have one single color.

For example, a first LED (of a first color) is driven periodically with a current for a predetermined amount of time, then a second LED (of a second color) is driven periodically with the same current for a predetermined amount of time, and then a third LED (of a third color) is driven periodically with the current for a predetermined amount of time. Each of the three predetermined amounts of time may be the same amount of time or different amounts of time. The mixed color is therefore controlled by changing the duty cycle of each color. For example, if you have an RGB LED and desire a specific output, red may be driven for a portion of the cycle, green for a different portion of the cycle, and blue is driven for yet another portion of the cycle based on the perception of the human eye. Instead of driving the red LED at a lower current, it is driven at substantially the same current for a shorter time. This example demonstrates the downside of PWM with the LEDs being utilized poorly, therefore leading to an inefficient use of power. In some embodiments, the current is supplied from a voltage-controlled current source.

Another advantage of the disclosed subject matter over the prior art is that the desaturated RGB approach can create tunable light on and off the BBL, as well as on the BBL, for example, an isothermal CCT line (as described below) while maintaining a high CRI. Various other prior art systems, in comparison, utilize a CCT approach where tunable color-points fall on a straight line between two primary colors of LEDs (e.g., R-G, R-B, or G-B).

FIG. 1 shows a portion of an International Commission on Illumination (CIE) color chart 100, including a black body line (BBL) 101 (also referred to as a Planckian locus) that forms a basis for understanding various embodiments of the subject matter disclosed herein. The BBL 101 shows the chromaticity coordinates for blackbody radiators of varying temperatures. It is generally agreed that, in most illumination situations, light sources should have chromaticity coordinates that lie on or near the BBL 101. Various mathematical procedures known in the art are used to determine the "closest" blackbody radiator. As noted above, this common lamp specification parameter is called the correlated color temperature (CCT). A useful and complementary way to further describe the chromaticity is provided by the $D_{uv}$ value, which is an indication of the degree to which a lamp's chromaticity coordinate lies above the BBL 101 (a positive $D_{uv}$ value) or below the BBL 101 (a negative $D_{uv}$ value).

The portion of the color chart is shown to include a number of isothermal lines 117. Even though each of these lines is not on the BBL 101, any color point on the isothermal line 117 has a constant CCT. For example, a first isothermal line 117A has a CCT of 10,000 K, a second isothermal line 117B has a CCT of 5,000 K, a third isothermal line 117C has a CCT of 3,000 K, and a fourth isothermal line 117D has a CCT of 2,200 K.

With continuing reference to FIG. 1, the CIE color chart 100 also shows a number of ellipses that represent a Macadam Ellipse (MAE) 103, which is centered on the BBL 101 and extends one step 105, three steps 107, five steps 109, or seven steps 111 in distance from the BBL 101. The MAE is based on psychometric studies and defines a region on the CIE chromaticity diagram that contains all colors which are indistinguishable, to a typical observer, from a color at the center of the ellipse. Therefore, each of the MAE steps 105 to 111 (one step to seven steps) are seen to a typical observer as being substantially the same color as a color at the center of a respective one of the MAEs 103. A series of curves, 115A, 115B, 115C, and 115D, represent substantially equal distances from the BBL 101 and are related to $D_{uv}$ values of, for example, +0.006, +0.003, 0, −0.003 and −0.006, respectively.

Figure 2A:
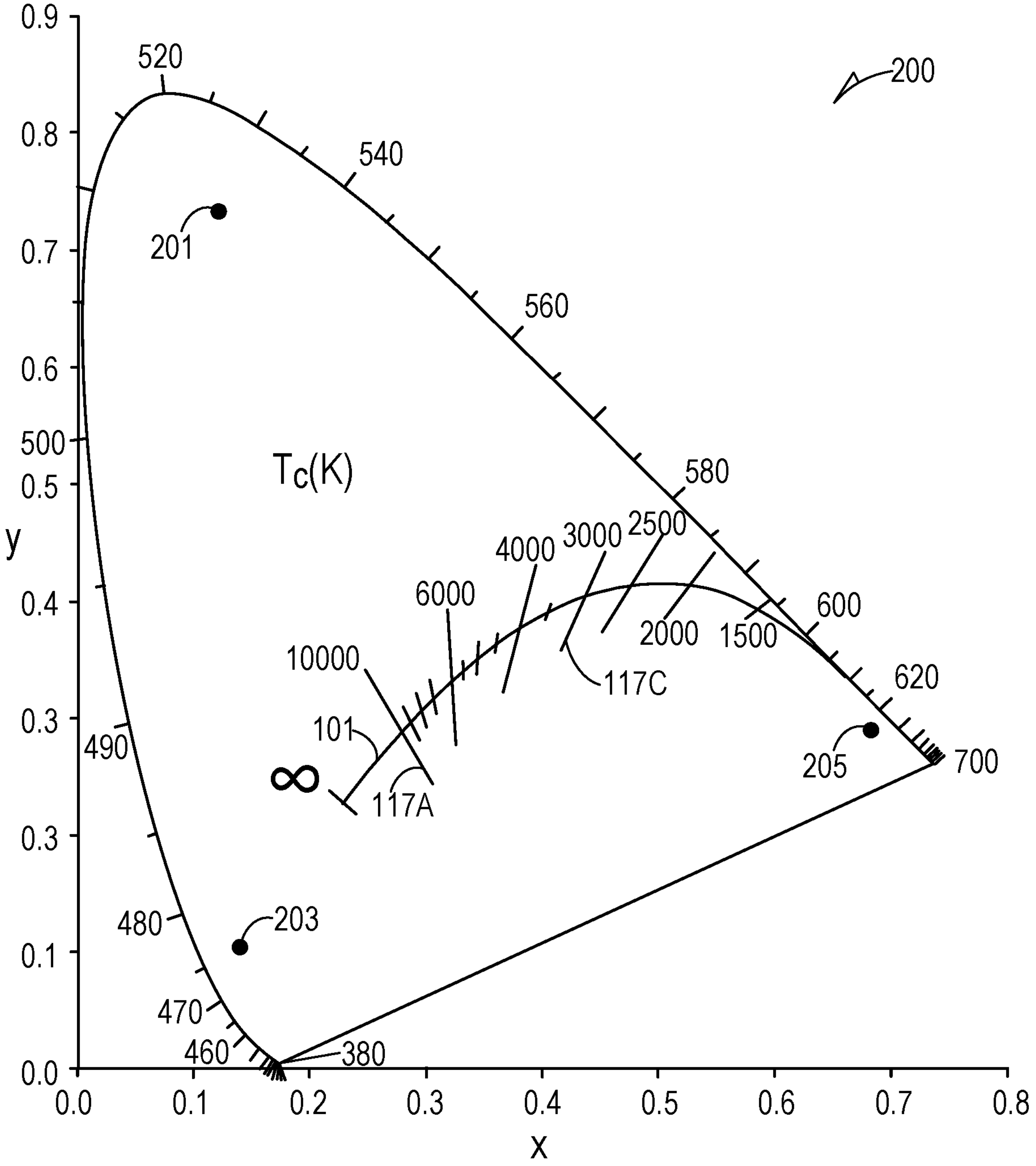
FIG. 2A shows a chromaticity diagram with approximate chromaticity coordinates of colors for typical red (R), green (G), and blue (B) LEDs, on the diagram, and including a BBL.

Referring now to FIG. 2A, and with continuing reference to FIG. 1, FIG. 2A shows a chromaticity diagram 200 with approximate chromaticity coordinates of colors for typical coordinate values (as noted on the x-y scale of the chromaticity diagram 200) for a red (R) LED at coordinate 205, a green (G) LED at coordinate 201, and a blue (B) LED at coordinate 203. FIG. 2A shows an example of the chromaticity diagram 200 for defining the wavelength spectrum of a visible light source, in accordance with some embodiments. The chromaticity diagram 200 of FIG. 2A is only one way of defining a wavelength spectrum of a visible light source; other suitable definitions are known in the art and can also be used with the various embodiments of the disclosed subject matter described herein.

A convenient way to specify a portion of the chromaticity diagram 200 is through a collection of equations in the x-y plane, where each equation has a locus of solutions that defines a line on the chromaticity diagram 200. The lines may intersect to specify a particular area, as described below in more detail with reference to FIG. 2B. As an alternative definition, the white light source can emit light that corresponds to light from a blackbody source operating at a given color temperature.

The chromaticity diagram 200 also shows the BBL 101 as described above with reference to FIG. 1. Each of the three LED coordinate locations 201, 203, 205 are the CCT coordinates for "fully-saturated" LEDs of the respective colors green, blue, and red. However, if a "white light" is created by combining certain proportions of the R, G, and B LEDs, the CRI of such a combination would be extremely low. Typically, in the environments described above, such as retail or hospitality settings, a CRI of about 90 or higher is desirable.

Figure 2B:
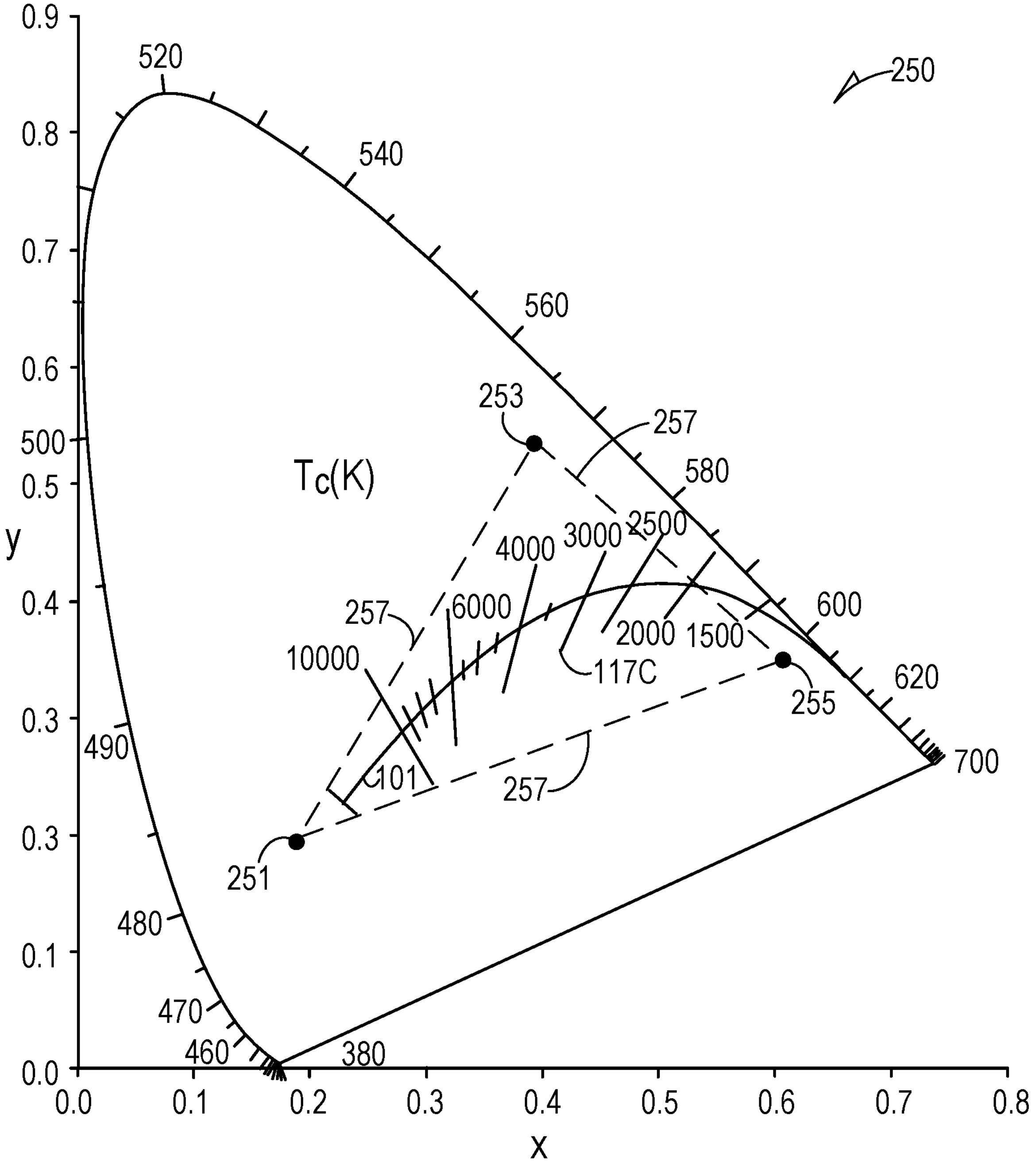
FIG. 2B shows a revised version of the chromaticity diagram of FIG. 2A, with approximate chromaticity coordinates for desaturated R, G, and B LEDs in proximity to the BBL, the desaturated R, G, and B LEDs having a color-rendering index (CRI) of approximately 90+ and within a defined color temperature range, in accordance with various embodiments of the disclosed subject matter.

FIG. 2B shows a revised version of the chromaticity diagram 200 of FIG. 2A, with approximate chromaticity coordinates for desaturated R, G, and B LEDs in proximity to the BBL, the desaturated R, G, and B LEDs having a color-rendering index (CRI) of approximately 90+ and within a defined color temperature range, in accordance with various embodiments of the disclosed subject matter.

However, the chromaticity diagram 250 of FIG. 2B shows approximate chromaticity coordinates for desaturated (pastel) R, G, and B LEDs in proximity to the BBL 101. Coordinate values (as noted on the x-y scale of the chromaticity diagram 250) are shown for a desaturated red (R) LED at coordinate 255, a desaturated green (G) LED at coordinate 253, and a desaturated blue (B) LED at coordinate 251. In various embodiments, a color temperature range of the desaturated R, G, and B LEDs may be in a range from about 1800 K to about 2500 K. In other embodiments, the desaturated R, G, and B LEDs may be in a color temperature range of, for example, about 2700 K to about 6500 K. In still other embodiments, the desaturated R, G, and B LEDs may be in a color temperature range of about 1800 K to about 7500 K. In still other embodiments, the desaturated R, G, and B LEDs may be selected to be in a wide range of color temperatures. As noted above, the color rendering index (CRI) of a light source does not indicate the apparent color of the light source; that information is given by the correlated color temperature (CCT). The CRI is therefore a quantitative measure of the ability of a light source to reveal the colors of various objects faithfully in comparison with an ideal or natural-light source.

In a specific exemplary embodiment, a triangle 257 formed between each of the coordinate values for the desaturated R, G, and B LEDs is also shown. The desaturated R, G, and B LEDs are formed (e.g., by a mixture of phosphors and/or a mixture of materials to form the LEDs as is known in the art) to have coordinate values in proximity to the BBL 101. Consequently, the coordinate locations of the respective desaturated R, G, and B LEDs, and as outlined by the triangle 257, has a CRI have approximately 90 or greater and an approximate tunable color-temperature-range of, for example, about 2700 K to about 6500 K. Therefore, the selection of a correlated color temperature (CCT) may be selected in the color-tuning application described herein such that all combinations of CCT selected all result in the lamp having a CRI of 90 or greater. Each of the desaturated R, G, and B LEDs may comprise a single LED or an array (or group) of LEDs, with each LED within the array or group having a desaturated color the same as or similar to the other LEDs within the array or group. A combination of the one or more desaturated R, G, and B LEDs comprises a lamp.

Figure 2C:
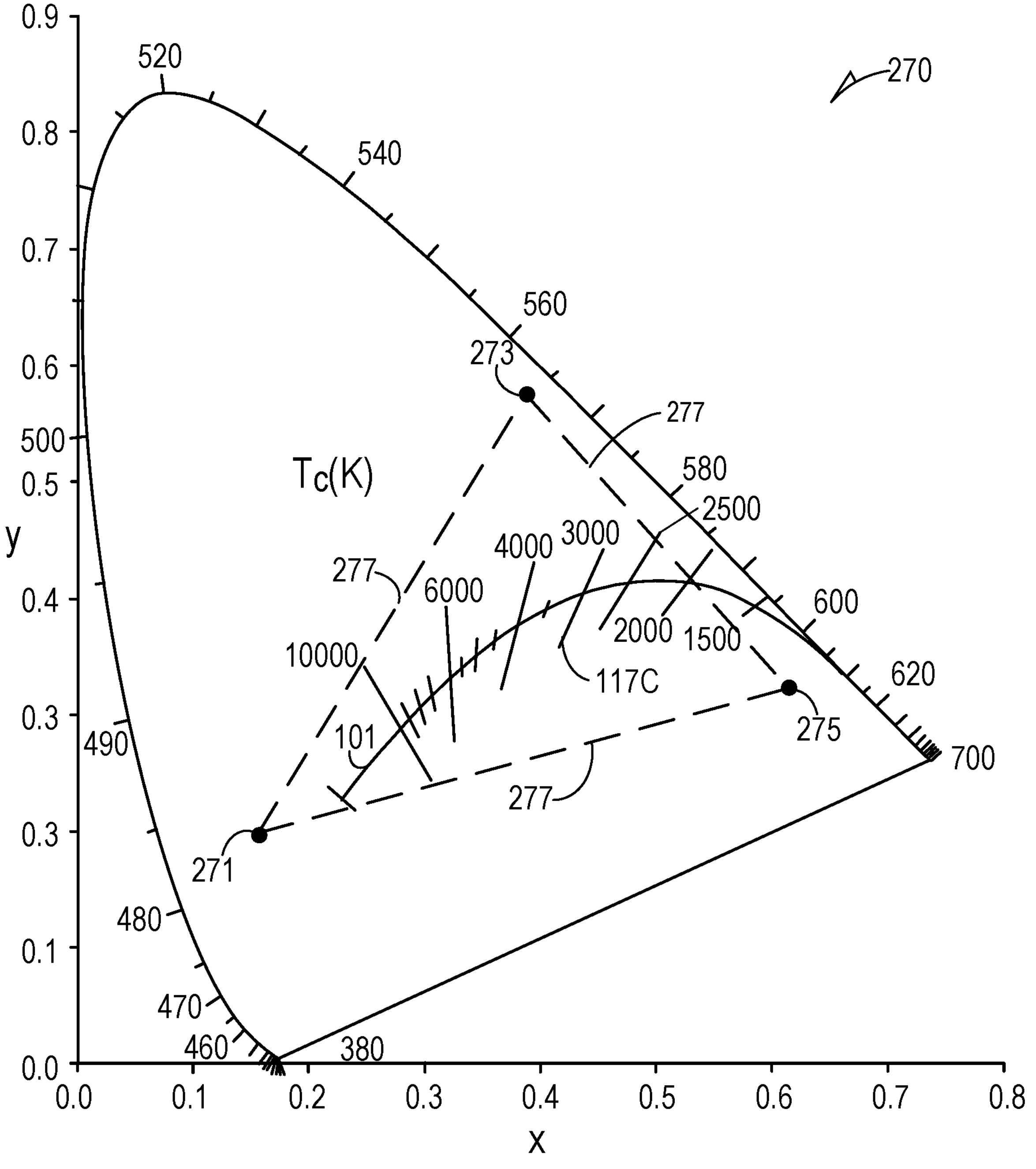
FIG. 2C shows a revised version of the chromaticity diagram of FIG. 2A, with approximate chromaticity coordinates for desaturated R, G, and B LEDs in proximity to the BBL, the desaturated R, G, and B LEDs having a color-rendering index (CRI) of approximately 80+ and within a defined color temperature range that is broader than the desaturated R, G, and B LEDs of FIG. 2B, in accordance with various embodiments of the disclosed subject matter.

FIG. 2C shows a revised version of the chromaticity diagram 200 of FIG. 2A, with approximate chromaticity coordinates for desaturated R, G, and B LEDs in proximity to the BBL, the desaturated R, G, and B LEDs having a color-rendering index (CRI) of approximately 80+ and within a defined color temperature range that is broader than the desaturated R, G, and B LEDs of FIG. 2B, in accordance with various embodiments of the disclosed subject matter.

However, the chromaticity diagram 270 of FIG. 2C shows approximate chromaticity coordinates for desaturated R, G, and B LEDs that are arranged farther from the BBL 101 than the desaturated R, G, and B LEDs of FIG. 2B. Coordinate values (as noted on the x-y scale of the chromaticity diagram 270) are shown for a desaturated red (R) LED at coordinate 275, a desaturated green (G) LED at coordinate 273, and a desaturated blue (B) LED at coordinate 271. In various embodiments, a color temperature range of the desaturated R, G, and B LEDs may be in a range from about 1800 K to about 2500 K. In other embodiments, the desaturated R, G, and B LEDs may be in a color temperature range of about 2700 K to about 6500 K. In still other embodiments, the desaturated R, G, and B LEDs may be in a color temperature range of about 1800 K to about 7500 K.

In a specific exemplary embodiment, a triangle 277 formed between each of the coordinate values for the desaturated R, G, and B LEDs is also shown. The desaturated R, G, and B LEDs are formed (e.g., by a mixture of phosphors and/or a mixture of materials to form the LEDs as is known in the art) to have coordinate values in proximity to the BBL 101. Consequently, the coordinate locations of the respective desaturated R, G, and B LEDs, and as outlined by the triangle 277, has a CRI have approximately 80 or greater and an approximate tunable color-temperature-range of, for example, about 1800 K to about 7500 K. Since the color temperature range is greater than the range shown in FIG. 2B, the CRI is commensurately decreased to about 80 or greater. However, a person of ordinary skill in the art will recognize that the desaturated R, G, and B LEDs may be produced to have individual color temperatures anywhere within the chromaticity diagram. Therefore, the selection of a correlated color temperature (CCT) may be selected in the color-tuning application described herein such that all combinations of CCT selected all result in the lamp having a CRI of 80 or greater. Each of the desaturated R, G, and B LEDs may comprise a single LED or an array (or group) of LEDs, with each LED within the array or group having a desaturated color the same as or similar to the other LEDs within the array or group. A combination of the one or more desaturated R, G, and B LEDs comprises a lamp.

Figure 3:
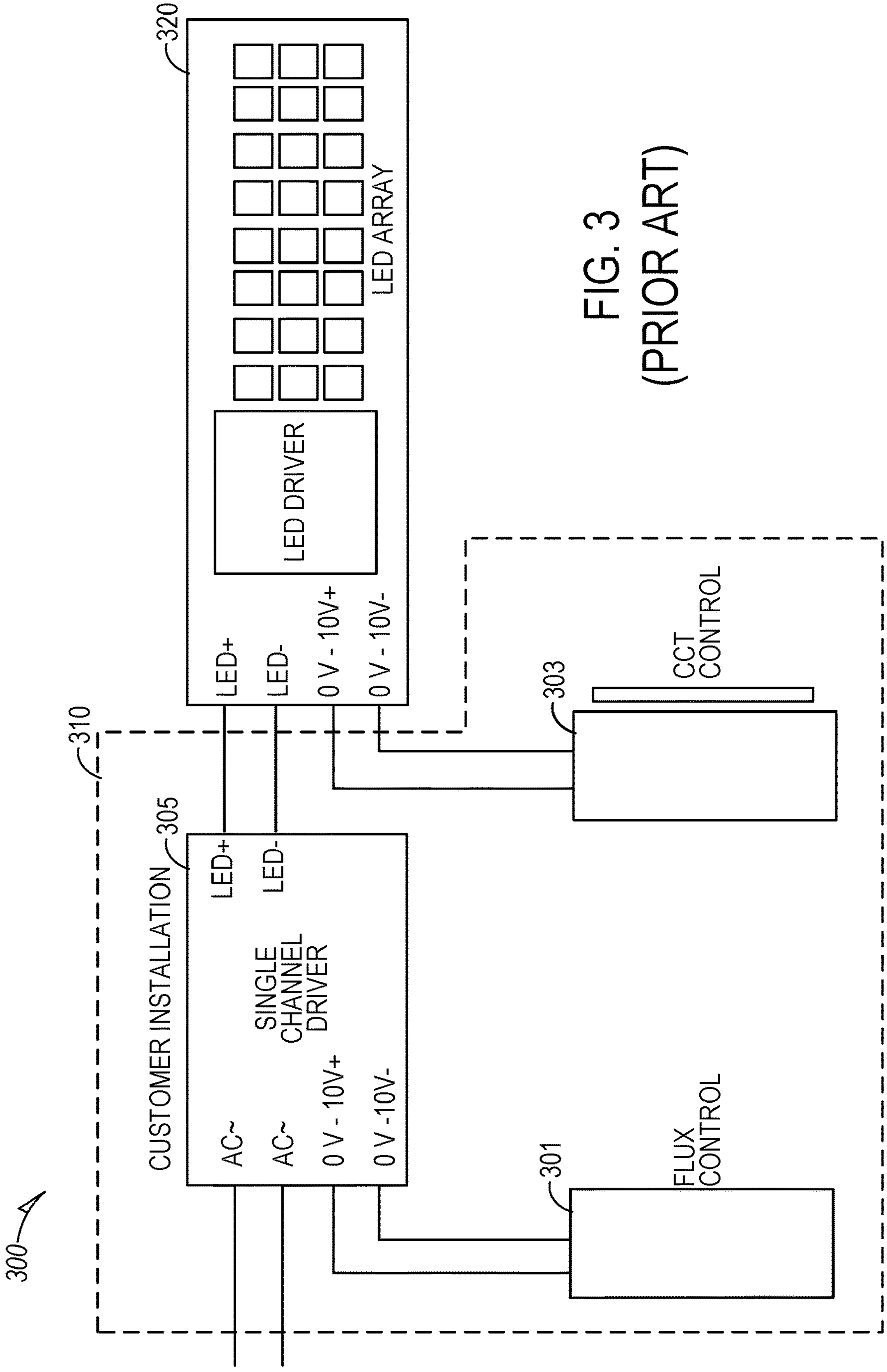
FIG. 3 (PRIOR ART)
FIG. 3 shows a color-tuning device of the prior art requiring a hard-wired flux control-device and a separate, hard-wired CCT control-device.

FIG. 3 shows a color-tuning device 300 of the prior art requiring a hard-wired flux-control device 301 and a separate, hard-wired CCT-control device 303. The flux-control device 301 is coupled to a single-channel driver circuit 305 and the CCT-control device is coupled to a combination LED-driving circuit/LED array 320. The combination LED-driving circuit/LED array 320 may be a current-driver circuit, a PWM driver circuit, or a hybrid current-driver/PWM-driver circuit. Each of the flux-control device 301, the CCT-control device 303, and the single-channel driver circuit 305 is located in a customer facility 310 and all devices generally must be installed with applicable national and local rules governing high-voltage circuits. The combination LED-driving circuit/LED array 320 is generally located remotely (e.g., a few meters to dozens of meters or more) from the customer facility 310. Consequently, both the initial purchase price and the installation price may be significant.

Consequently, in a conventional color-tunable system which operates off a single-channel constant-current driver, two control inputs are usually required, one for flux control (e.g., luminous flux or dimming) and the other for color tuning. The control inputs can be realized by, for example, electrical-mechanical devices, such as linear or rotary sliders, DIP switches, or a standard 0 V to 10V dimmer. While the dimmer for flux control may already be present in existing installations, it may be difficult and costly to accommodate a second dimmer for CCT control in a retrofit scenario due to electrical wiring requirements including various types of code compliance issues. The disclosed subject matter overcomes these limitations and expenses by eliminating all dimmers from an installation. As will be instantly recognizable to a person of ordinary skill in the art upon reading and understanding the disclosed subject matter described below, all physical control devices (e.g., dimmers) are eliminated.

Figure 4:
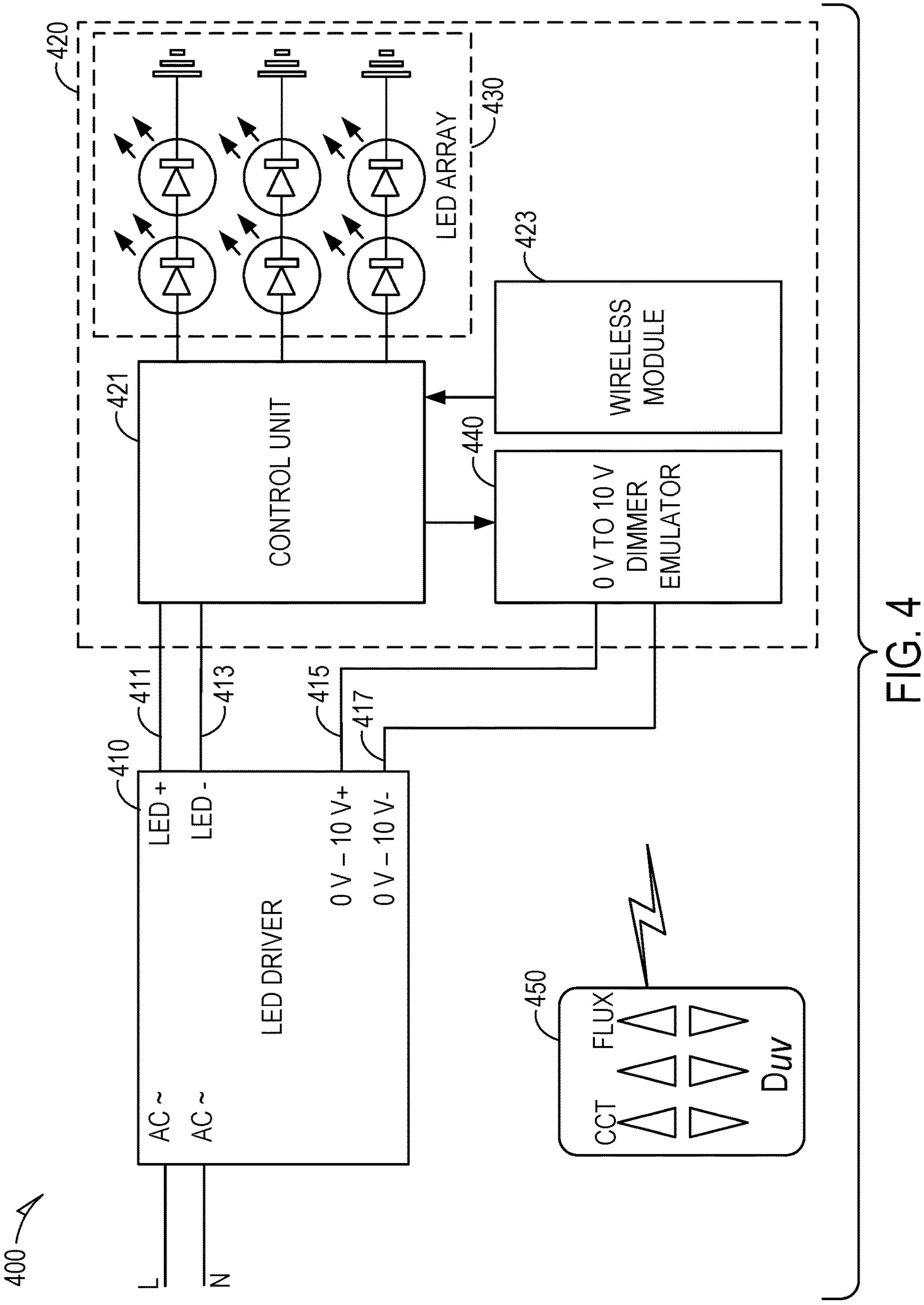
FIG. 4 shows an example of a high-level schematic diagram of a wireless color-tuning device, a controller unit, a dimmer emulator, a wireless module, and an LED array comprising, for example, the desaturated LEDs of FIGS. 2B and 2C, in accordance with various embodiments of the disclosed subject matter.

FIG. 4 shows an example of a high-level schematic diagram of a wireless color-tuning device 400, including a control unit 421, a dimmer emulator 440, a wireless control-device 450, a wireless module 423, and an LED array 430. The LED array 430 may comprise, for example, the desaturated LEDs of FIGS. 2B and 2C, in accordance with various embodiments of the disclosed subject matter.

The dimmer emulator 440 is described in detail with reference to FIG. 5, below. However, in various embodiments, the dimmer emulator 440 can perform many operations consecutively. Such operations can include, for example, receiving and processing signals of at least one of CCT, $D_{uv}$, and luminous flux. In some embodiments in which the dimmer emulator 440 performs multiple operations substantially concurrently, the dimmer emulator 440 may be instantiated multiple times to control various operations of the LED array 430. If the wireless color-tuning device 400 is configured only to control luminous flux, a person of ordinary skill in the art may consider the wireless color-tuning device 400 to be a wireless LED-control device.

In some embodiments, each of the control unit 421, the dimmer emulator 440, the wireless module 423, and the LED array 430 may be contained within a light-engine enclosure 420. In some embodiments, one or more of the control unit 421, the dimmer emulator 440, the wireless module 423, and/or the LED array 430 may be physically located within the light-engine enclosure 420 and others of the control unit 421, the dimmer emulator 440, the wireless module 423, and/or the LED array 430 may be located outside of the light-engine enclosure 420 either nearby (e.g., within a few meters) or more remotely (e.g., dozens of meters) from each other. As is instantly recognizable to a person of ordinary skill in the art, all physical control-devices that are hard-wired (e.g., dimmers) are eliminated.

The wireless color-tuning device 400 includes a single-channel driver circuit (e.g., LED driver 410). In some embodiments, the LED driver 410 may be located within a customer installation-area. In some embodiments, the LED driver 410 may be located remotely from a customer installation-area (but generally still within a customer facility). In some embodiments, the LED driver 410 may be located within the light-engine enclosure 420 (e.g., a junction box or other type of electronics enclosure used for housing various types of electrical or electronic components).

As is known to a person of ordinary skill in the art, since light output of an LED is proportional to an amount of current used to drive the LED, dimming an LED can be achieved by, for example, reducing the forward current transferred to the LED. The LED driver 410 sends a predetermined amount of current to one, two, or all three colors of the LED array 430 to change an overall CCT and/or $D_{uv}$ level of the LED array 430.

However, in addition to or instead of changing an amount of current used to drive each of individual ones of the LEDs in the LED array 430, a control unit (described below with reference to FIG. 5) may rapidly switch selected ones of the LEDs or selected groups of colors in the LED array 430 between "on" and "off" states to achieve an appropriate level of dimming for the selected lamp in accordance with intensities desired as indicated by an end-user in setting a level of desired brightness on, for example, a flux-control device.

The LED driver 410 is coupled through an LED+ signal line 411 and an LED− signal line 413 provide power to the LED array 430, through the control unit 421. The control unit 421 may be, for example, a microcontroller, a microprocessor, or other processing unit known in the art. In some embodiments, the control unit 421 may be, for example, a special-purpose processor, such as a field-programmable gate array (FPGA) or an application specific integrated circuit (ASIC). The control unit 421 is configured to control the LED array 430, which is coupled to the control unit 421. For example, the control unit 421 receives wireless-based signals from the wireless module 423 to control various operations and lighting modes of the LED array 430. As discussed above, the control operations may include, for example, a received signal to adjust luminous flux, CCT, and/or $D_{uv}$ distance from the BBL (for example, along an isothermal line of the received CCT—see FIG. 1). The LED array 430 can be any type of multi-colored LED array including the desaturated-types of LEDs described above with reference to FIGS. 2B and 2C.

Signals received from the wireless module 423 are interpreted or translated by an algorithm within the control unit 421. The interpretation or translation provides a determination how the received wireless-signals affect operations of the LED array 430. For example, the control unit 421 may relate a specific signal amplitude and signal type (e.g., a series and periodicity of the received signals) to a particular operation of the LED arrays 430. The particular types of operations can include at least one of CCT, $D_{uv}$, and/or luminous flux.

In some embodiments, the determination of how the received wireless-signals affect operations of the LED array 430 is made by comparing the received signal to a lookup table (LUT) stored, for example, within the control unit 421 to a particular CCT, $D_{uv}$, and/or luminous flux setting of one or more groups of individual colors of LEDs within the LED array 430. In various embodiments, a translation mechanism of the control unit 421 includes both the algorithm embodiment and the LUT embodiment that may be used concurrently to translate various components of the received signal.

Further, although not shown explicitly, the control unit 421 may control switching operations of individual LEDs or groups of a single LED color within the LED array 430. For example, the control unit can provide a PWM signal, based on the signal received from the wireless module 423, to provide user-selected CCT, $D_{uv}$, and/or luminous flux to the LED array 430 by switching selected colors or color groups of LEDs within the LED array 430.

In various embodiments, at least one of the LED driver 410 (see FIG. 4) and the control unit 421 may comprise or include a hybrid LED driving-circuit for CCT and $D_{uv}$ tuning, as well as for luminous-flus control. The hybrid driving-circuit can include an LED driver to produce a stabilized LED-driver current. In a specific exemplary embodiment, the control unit 421 delivers the current to the appropriate ones of LEDs or color groups of LEDs within the LED array 430 based on, for example, the desired CCT and $D_{uv}$ tuning. The hybrid driving-circuit within the control unit 421 may then be overlaid with PWM time-slicing directing current to at least two colors of the LED array 430.

In various embodiments, the control unit 421 can be configured to have a special calibration mode. The calibration mode can function with either the algorithm (although the user may need access to the underlying software or firmware to change values) or values in the LUT. For example, the control unit 421 can enter the calibration mode if it is power cycled in a special sequence (e.g., a combination of long and short power-up/down cycles). While in this calibration mode, the user (e.g., a calibrating technician at the factory or an advanced end-user) is asked to change the correlation values of the output signals of the three control devices to their respective controlled-values (CCT, $D_{uv}$, and/or flux). The control unit 421 then stores these two algorithms or values in, for example, software in an internal memory or firmware (e.g., an EEPROM), or hardware (e.g., a Field Programmable Gate Array (FPGA)). The internal memory can take a number of forms including, for example, electrically erasable programmable read-only memory (EEPROM), phase-change memory (PCM), flash memory, or various other types of non-volatile memory devices known in the art.

With continuing reference to FIG. 4, the wireless module 423 provides signals, received wirelessly, to the control unit 421. The wireless module 423 can be of any type of open-source standard or proprietary standard. In various embodiments, the wireless module 423 is configured to provide signals to the control unit 421 via pre-defined protocols (some of which are described below). In some embodiments, it may be desirable for the wireless module 423 to have a low-power consumption if it is powered from the LED current. In case the wireless module 423 operates in bursts of high-peak current, a large decoupling capacitor (described below with reference to FIG. 5) may be used to reduce voltage/current (power) dips in power supplied to the LED (e.g., voltage and/or current), thereby eliminating or reducing light flicker from the LED array 430.

The wireless module 423 may be configured to receive signals and to communicate in pre-defined protocols, known in the art, with the control unit 421 over, for example, a serial interface. In a specific exemplary embodiment, the wireless module 423 uses a universal asynchronous receiver-transmitter (UART) communications protocol. In other embodiments, the wireless module 423 may use a inter-integrated circuit (I-squared-C or $I^2C$) protocol, a Serial Peripheral Interface (SPI), or other type of communications protocol known in the art. The wireless signals may be transferred from the wireless control-device 450 at a remote location to the wireless color-tuning device 400 via Wi-Fi®, Bluetooth®, Zigbee®, Z-Wave®, fifth-generation cellular-network technology (5G), or other communication technology-signals known in the art.

Further, although the wireless control-device 450 is shown to include buttons to either increase or decrease each of CCT, $D_{uv}$, and luminous flux, only one or two of the sets of buttons may be included in an actual wireless device. For example, in some embodiments, the wireless control-device 450 may only include a single set of buttons to increase or decrease CCT. In other embodiments, the wireless control-device 450 may only include two sets of buttons to increase or decrease both CCT and luminous flux. In still other embodiments, the wireless control-device 450 may include only a single "increase and decrease" set of buttons with a selector switch to determine which one of, for example, CCT, $D_{uv}$, and luminous flux relates to the increase and decrease set of buttons. The programming of such signals emanating from the wireless control-device 450 for a given communications protocol is known in the art.

The wireless control-device 450 may comprise an electrical control-device, a mechanical control-device, or a software control-device, each of which is configured to transmit a signal (e.g., indicative of end-user preferences for CCT, $D_{uv}$, and/or luminous flux (an intensity level of the LED array 430)) to the wireless module 423 of FIG. 4. The wireless control-device 450 may be based on analog or digital signals. If the wireless control-device is based on an analog output, one of the components within the light-engine enclosure 420, such as, for example, the wireless module 423 or the control unit 421, can include an analog-to-digital converter (ADC).

The dimmer emulator 440 receives instructions from the control unit 421 to provide signals on a 0 V to 10 V+ signal line 415 and a 0 V to 10 V+ signal line 417 to an input of the LED driver 410. The dimmer emulator is described in more detail with reference to FIG. 5, below.

In various embodiments, the dimmer emulator 440 is not powered by current supplied by the LED driver 410 to the LED array 430. In these embodiments, the power for the dimmer emulator 440 may be supplied by the 0 V to 10 V interface of the LED driver 410. Most commercially-available LED 0 V to 10 V interfaces provides a unit current from between about 150 μA and about 200 μA. In other embodiments, a separate power supply may be installed near the dimmer emulator 440 (e.g., within the light-engine enclosure 420).

Typically, under the prior art, when a physical 0 V to 10 V dimmer is used, the physical dimmer is configured to control one or many LED drivers at the same time. When multiple LED drivers are connected to the same dimmer, the dimmer must be able to sink the sum of all the currents and still maintain a relatively stable, output voltage. On the other hand, the dimmer must also be able to operate reliably from just one LED driver. In electrical terms, the dimmer should behave as a variable constant-voltage regulator regardless of its input current. The output voltage is generally determined by its control input only (e.g., usually the position of a slider).

Figure 5:
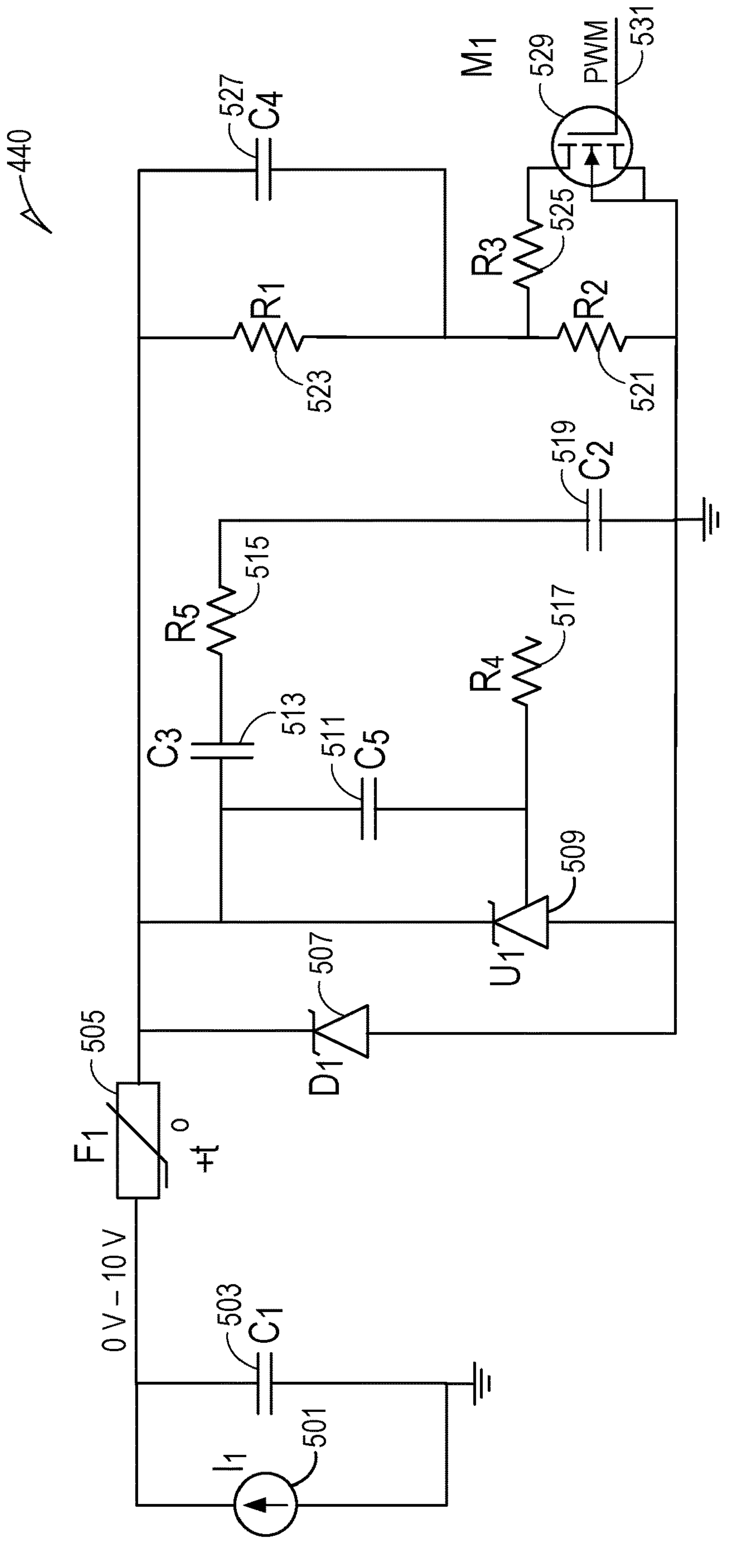
FIG. 5 shows an exemplary embodiment of a dimmer emulator, in accordance with various exemplary embodiments of the disclosed subject matter.

FIG. 5 shows an exemplary embodiment of the dimmer emulator 440 of FIG. 4, in accordance with various exemplary embodiments of the disclosed subject matter. In this exemplary embodiment, the dimmer emulator 440 is shown to include a current source 501, a first capacitor 503, $C_1$, an optional overcurrent-protection device 505, $F_1$, a diode 507, $D_1$, an adjustable-voltage reference 509, $U_1$, and other components described in detail below. The other components form a transient response and frequency-stability circuit, as well as a resistive voltage-divider with a variable voltage-divider ratio.

A combination of the current source 501 and the first capacitor 503, $C_1$, represents the 0 V to 10 V interface output of the LED driver 410 of FIG. 4. In a specific exemplary embodiment, the first capacitor 503 comprises a 1 μF capacitor. The combination of the current source 501 and the first capacitor 503, $C_1$, provides a current, $I_1$, of about 150 μA to the remainder of the circuit comprising the dimmer emulator 440.

The diode 507, $D_1$, protects the dimmer emulator 440 circuit from moderate levels of over-current and/or over-voltage. The optional overcurrent-protection device 505, $F_1$, may comprise a resettable fuse for protection of the dimmer emulator 440 circuit against high levels of over-current, such as erroneously connecting an output of the LED driver 410 output to the dimmer emulator 440 circuit. Therefore, the optional overcurrent-protection device 505 is inserted in series upstream of the diode 507 (e.g., between the combination of the current source 501 and the first capacitor 503, $C_1$, and the diode 507). In a specific exemplary embodiment, the diode 507 comprises an 11 V Zener diode. The optional overcurrent-protection device 505 may comprise a positive temperature-coefficient (PTC) device. In various embodiments, the optional overcurrent-protection device 505 is also known generically as any type of passive-component resettable fuse device such as a multi-fuse, poly-fuse, or poly-switch device.

In various embodiments, the adjustable-voltage reference 509, $U_1$ (described in more detail below), comprises a precision, variable shunt-voltage regulator. In this embodiment, the adjustable-voltage reference 509, $U_1$, comprises a low-voltage, three-terminal adjustable-voltage reference, having a specified thermal stability over a selected temperature range. In a specific exemplary embodiment, the adjustable-voltage reference 509, $U_1$, is a TLV431AFTA device (manufactured by Diodes Incorporated, 4949 Hedgcoxe Road, Suite 200; Plano, Texas, 75024, USA). In this specific exemplary embodiment, the output voltage of the adjustable-voltage reference 509 can be set to any value between $V_{REF}$ of 1.24 V and 18 V with two external resistors—a fourth resistor 517, $R_4$, and a fifth resistor 515, $R_5$. In a specific exemplary embodiment, values of resistance for $R_4$ and $R_5$ are each about 1 kΩ. As discussed in more detail below, an output voltage, $V_{out}$, can be set to be as low as the reference voltage $V_{REF}$ (e.g., 1.24 V±1%).

With continuing reference to FIG. 5, a first resistor 523, $R_1$, a second resistor 521, $R_2$, and a third resistor, $R_3$, combined with a transistor 529, $M_1$, collectively determine a voltage appearing at the 0 V to 10 V+ node (see FIG. 4). An operation of the transistor 529, $M_1$, is controlled by a signal on a signal line 531 that is coupled to a gate of the transistor 529. The signal may be, for example, a PWM signal. This collective combination of components, $R_1$, $R_2$, $R_3$, and $M_1$, determines the voltage regardless of the input current. In this embodiment, the only control signal is the duty cycle of the PWM signal. In a specific exemplary embodiment, the signal line 531 is coupled to the gate of a field-effect transistor (e.g., a MOSFET device). Each of the second resistor 521 and the third resistor 525 are coupled to opposite sides of the transistor 529 (e.g., to the drain and source of the transistor). Therefore, the PWM signal on the signal line 531 controls the conductance on current by the drain and the source.

Between 0% and 100%, the circuit is able to cover a wide voltage range. Analyses of two extremes of the PWM duty cycle is presented immediately below to better illustrate the function of this collective combination of components.

At a 0% PWM duty-cycle (e.g., no voltage signal on the signal line 531 is present), the transistor 529, $M_1$, is constantly off. Therefore, the third resistor 525, $R_3$, is open-circuit. Consequently, the first resistor 523, $R_1$, and the second resistor 521, $R_2$, form a resistive voltage-divider. When the adjustable-voltage reference 509, $U_1$, is in operation, the reference input-voltage is approximately, for example, 1.24 V. In this case, a value within the 0 V to 10 V+ range is determined by:

$$V_{out} = \frac{(R_1 + R_2)}{R_2} \cdot 1.24\ \text{V} \tag{1}$$

Using the exemplary values of $R_1$=72 kΩ and $R_2$=240 kΩ given above, the value for $V_{out}$ determined by equation (1) is approximately 1.61 V. As the resistive voltage-divider comprised of $R_1$ and $R_2$ is an attenuator, the value of 0 V to 10 V+ cannot be lower than the reference voltage (e.g., 1.24 V). If a lower voltage is desired, a similar circuit with a reference voltage lower than 1.24 V can be used.

Continuing with the other extreme of the analyses, at a 100% PWM duty-cycle (e.g., a maximum voltage signal on the signal line 531 is present), the transistor 529, $M_1$, is constantly on. Consequently, the third resistor 525, $R_3$, is in parallel with the second resistor 521, $R_2$, and the parallel combination of $R_2$ and $R_3$ is in series with the first resistor 523, $R_1$. In this case, the value of the 0 V to 10 V signal is determined by:

$$V_{out} = \left[\frac{R_1 + R_2/R_3}{R_2/R_3}\right] \cdot 1.24\ \text{V} \tag{2}$$

As recognizable to a skilled artisan, there are now two equations and three variables. However, a third equation is given by the 0 V to 10 V+ voltage at the 100% PWM duty-cycle and the minimum input current of 150 μA as given by the exemplary description above. The target therefore is to have 10 V at this condition (as noted above, a broad voltage range is desired). The adjustable-voltage reference 509, $U_1$, consumes some current and thus not all of the 150 μA flows through the first resistor 523, $R_1$. The actual current consumption of the adjustable-voltage reference 509, $U_1$, in regulation, can experimentally be obtained. Therefore, the third equation becomes:

$$I_{R1} \cdot (R_1 + R_2/R_3) = 10\ \text{V} \tag{3}$$

For the exemplary resistor values provided above, the value of $I_{R1}$ is approximately equal to 134.4 μA (therefore, the current loss through the adjustable-voltage reference 509, $U_1$, is approximately 15.6 μA (in this example, 150 μA-134.4 μA=15.6 μA).

In between these two states (1.24 V at the 0% PWM duty-cycle and 10 V at the 100% PWM duty-cycle), the switching of the transistor 529, $M_1$, causes the effective resistance in the path of the third resistor 525, $R_3$, to vary between the value of $R_3$ and a very high impedance. The effective change in the resistance value of $R_3$ creates a resistive voltage-divider with a variable ratio. In a specific exemplary embodiment, values of resistance for $R_1$, $R_2$, and $R_3$ are about 72 kΩ, about 240 kΩ, and about 10 kΩ, respectively.

With continuing reference to FIG. 5, a second capacitor 519, $C_2$, functions as a decoupling capacitor. The second capacitor 519, $C_2$, removes high-frequency ripple caused by the switching of the transistor 529, $M_1$ due to application of the PWM signal on the signal line 531. All other components shown in FIG. 5, for example, a third capacitor 513, $C_3$, a fourth capacitor 527, $C_4$, and a fifth capacitor 511, $C_5$, are for transient response and frequency stability.

In a specific exemplary embodiment, a value of capacitance of $C_2$ is about 4.7 μF. Values for $C_3$, $C_4$, and $C_5$ are each about 100 nF.

In some embodiments, various ones of the various components and modules described above may comprise software-based modules (e.g., code stored or otherwise embodied in a machine-readable medium or in a transmission medium), hardware modules, or any suitable combination thereof. A hardware module is a tangible (e.g., non-transitory) physical component (e.g., a set of one or more microcontrollers or microprocessors or other hardware-based devices) capable of performing certain operations and interpreting the output signals received from, for example, the wireless module 423 of FIG. 4. The one or more modules may be configured or arranged in a certain physical manner. In various embodiments, one or more microcontrollers or microprocessors, or one or more hardware modules thereof, may be configured by software (e.g., through an application or portion thereof) as a hardware module that operates to perform operations described herein for that module.

In some example embodiments, a hardware module may be implemented, for example, mechanically or electronically, or by any suitable combination thereof. For example, a hardware module may include dedicated circuitry or logic that is permanently configured to perform certain operations. A hardware module may be or include a special-purpose processor, such as a field-programmable gate array (FPGA) or an application specific integrated circuit (ASIC). A hardware module may also include programmable logic or circuitry that is temporarily configured by software to perform certain operations. As an example, a hardware module may include software encompassed within a central processing unit (CPU) or other programmable processor. It will be appreciated that a decision to implement a hardware module mechanically, electrically, in dedicated and permanently configured circuitry, or in temporarily configured circuitry (e.g., configured by software) may be driven by cost and time considerations.

In various embodiments, many of the components described may comprise one or more modules configured to implement the functions disclosed herein. In some embodiments, the modules may constitute software modules (e.g., code stored on or otherwise embodied in a machine-readable medium or in a transmission medium), hardware modules, or any suitable combination thereof. A "hardware module" is a tangible (e.g., non-transitory) physical component (e.g., a set of one or more microprocessors or other hardware-based devices) capable of performing certain operations and interpreting certain signals. The one or more modules may be configured or arranged in a certain physical manner. In various embodiments, one or more microprocessors or one or more hardware modules thereof may be configured by software (e.g., an application or portion thereof) as a hardware module that operates to perform operations described herein for that module.

In some example embodiments, a hardware module may be implemented, for example, mechanically or electronically, or by any suitable combination thereof. For example, a hardware module may include dedicated circuitry or logic that is permanently configured to perform certain operations. As noted above, a hardware module may comprise or include a special-purpose processor, such as an FPGA or an ASIC. A hardware module may also include programmable logic or circuitry that is temporarily configured by software to perform certain operations, such as interpretation of the various signals received by the control unit 421 from the wireless module 423 (see FIG. 4).

The description above includes illustrative examples, devices, systems, and methods that embody the disclosed subject matter. In the description, for purposes of explanation, numerous specific details were set forth in order to provide an understanding of various embodiments of the disclosed subject matter. It will be evident, however, to those of ordinary skill in the art that various embodiments of the subject matter may be practiced without these specific details. Further, well-known structures, materials, and techniques have not been shown in detail, so as not to obscure the various illustrated embodiments.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other types of electrical control-devices, such as dimmers and related devices. Consequently, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A lighting system comprising a control apparatus to color tune at least one light-emitting diode (LED) array, the apparatus comprising:

at least one wireless module to receive a wireless signal from at least one wireless control-device;

at least one control unit coupled to the at least one wireless module to translate one or more signals received from the at least one wireless module, the at least one control unit configured to be coupled to the at least one LED array and to at least one LED driver, the at least one control unit configured to receive power for the at least one LED array from the at least one LED driver and to provide the power to the at least one LED array in a manner based on the translated signals; and at least one dimmer emulator coupled to the at least one control unit, the at least one dimmer emulator configured to provide one or more control signals to the at least one LED driver based on the one or more signals translated by the at least one control unit, the at least one dimmer emulator configured to perform operations consecutively, the operations selected from a set of operations that include receiving and processing signals of at least one of color temperature (CCT) value, a distance value ($D_{uv}$) of a temperature of the at least one LED array from a black-body line (BBL), and luminous flux.

2. The lighting system of claim 1, wherein the at least one dimmer emulator, the at least one wireless module, and the at least one LED array are contained within a single light-engine housing.

3. The lighting system of claim 1, wherein at least one of the at least one dimmer emulator, the at least one wireless module, and the at least one LED array is contained within a single light-engine housing and at least another of the at least one dimmer emulator, the at least one wireless module, and the at least one LED array is located outside the single light-engine housing.

4. The lighting system of claim 1, wherein the at least one LED driver is configured to send a predetermined amount of current to between one and three colors emitted by LEDs of the at least one LED array to change at least one of the CCT and $D_{uv}$ of the at least one LED array.

5. The lighting system of claim 4, wherein the at least one LED driver is configured to send the predetermined amount of current as pulse width modulated (PWM) time slicing directing current among a plurality of colors emitted by the LEDs.

6. The lighting system of claim 1, wherein the at least one control unit is configured to switch selected ones of LEDs or selected groups of colors in the at least one LED array between "on" and "off" states to achieve a level of dimming for a selected LED array in accordance with intensities as indicated by an end-user in setting a level of desired brightness on a flux-control device.

7. The lighting system of claim 1, wherein the at least one LED array comprises LEDs configured to emit multiple desaturated colors.

8. The lighting system of claim 1, wherein the at least one control unit includes a lookup table (LUT), the control unit configured to compare the at least one wireless control signal to the LUT to determine the CCT value and the $D_{uv}$.

9. The lighting system of claim 8, wherein the at least one control unit further includes an algorithm configured to correlate values of the wireless control signals with a corresponding value of the CCT value and the $D_{uv}$, and the LUT and the algorithm are configured to concurrently translate components of the at least one wireless control signal.

10. The lighting system of claim 8, wherein:

the at least one control unit further includes an algorithm configured to correlate values of the wireless control signals with a corresponding value of the CCT value and the $D_{uv}$, and the at least one control unit is configured to have a calibration mode configured to function with at least one of the algorithm or values in the LUT.

11. The lighting system of claim 10, wherein the at least one control unit is configured to enter the calibration mode in response to power cycling of the control apparatus in a predetermined sequence.

12. The lighting system of claim 10, wherein the at least one control unit, in the calibration mode, is configured to:

permit adjustment of correlation values of output signals of different control devices to respective controlled-values of CCT, $D_{uv}$, and flux, and subsequently store the values in at least one memory selected from a group that includes software in an internal memory, firmware, and hardware.

13. The lighting system of claim 1, wherein the at least one wireless module is configured to have a low-power consumption mode in response to being powered from an LED current.

14. The lighting system of claim 1, wherein:

the at least one wireless module is configured to operate in using bursts of high-peak current, and a decoupling capacitor is disposed to reduce dips in power supplied to the at least one LED array to at least reduce light flicker from the at least one LED array.

15. The lighting system of claim 1, wherein the at least one dimmer emulator is configured to be powered by current other than that supplied by the at least one LED driver to the at least one LED array.

16. The lighting system of claim 15, wherein the at least one dimmer emulator is configured to be supplied by a 0 V to 10 V interface of the at least one LED driver.

17. The lighting system of claim 15, wherein the at least one dimmer emulator is configured to be supplied by a separate power supply within a light-engine enclosure that houses the at least one control unit and at least one dimmer emulator.

18. A lighting system comprising a control apparatus to color tune at least one light-emitting diode (LED) array, the apparatus comprising:

at least one wireless module to receive a wireless signal from at least one wireless control-device;

at least one control unit coupled to the at least one wireless module to translate one or more signals received from the at least one wireless module, the at least one control unit configured to be coupled to the at least one LED array and to at least one LED driver, the at least one control unit configured to receive power for the at least one LED array from the at least one LED driver and to provide the power to the at least one LED array in a manner based on the translated signals; and a plurality of dimmer emulators coupled to the at least one control unit, the plurality of dimmer emulators configured to provide one or more control signals to the at least one LED driver based on the one or more signals translated by the at least one control unit, the at least one dimmer emulator configured to perform operations consecutively, the operations, the dimmer emulators configured to perform multiple different operations substantially concurrently, the operations selected from a set of operations that include receiving and processing signals of at least one of color temperature (CCT) value, a distance value ($D_{uv}$) of a temperature of the at least one LED array from a black-body line (BBL), and luminous flux.

19. The lighting system of claim 18, wherein:

the at least one control unit is configured to have a calibration mode, the at least one control unit is configured to enter the calibration mode in response to power cycling of the control apparatus in a predetermined sequence, and the at least one control unit, in the calibration mode, is configured to:

permit adjustment of correlation values of output signals of different control devices to respective controlled-values of CCT, $D_{uv}$, and flux, and subsequently store the values in at least one memory selected from a group that includes software in an internal memory, firmware, and hardware.

20. A method of operating a lighting system comprising a control apparatus to color tune at least one light-emitting diode (LED) array, the method comprising:

receiving, at at least one wireless module, a wireless signal from at least one wireless control-device;

translating, at at least one control unit coupled to the at least one wireless module, one or more signals received from the at least one wireless module, the at least one control unit coupled to the at least one LED array and to at least one LED driver;

receiving, at the at least one control unit, power for the at least one LED array from the at least one LED driver and providing the power to the at least one LED array in a manner based on the translated signals;

providing, at at least one dimmer emulator coupled to the at least one control unit, one or more control signals to the at least one LED driver based on the one or more signals translated by the at least one control unit, the at least one dimmer emulator configured to perform operations consecutively, the operations; and performing operations consecutively at the at least one dimmer emulator, the operations selected from a set of operations that include receiving and processing signals of at least one of color temperature (CCT) value, a distance value ($D_{uv}$) of a temperature of the at least one LED array from a black-body line (BBL), and luminous flux.

* * * * *